3,246,028
**PROCESS FOR THE PREPARATION OF CARBO-
CYCLIC AROMATIC NITRILES**
William G. Toland, Jr., San Rafael, Calif., assignor to
Chevron Research Company, a corporation of Delaware
No Drawing. Filed Dec. 6, 1961, Ser. No. 157,579
7 Claims. (Cl. 260—465)

This invention relates to a process for the production of carbocyclic aromatic cyanides. It particularly relates to a process for the production of carbocyclic aromatic cyanides by the liquid phase ammoxidation of methyl-substituted aromatic hydrocarbons.

It is known to prepare aromatic cyanides by contacting a vapor mixture of a methyl-substituted aromatic hydrocarbon, molecular oxygen, and ammonia with solid vanadium oxide-type oxidation catalysts at elevated temperatures, for example, at 400° C. and higher. In addition to the usual disadvantages of operation at the relatively high dilutions of vapor-phase reactions, such as explosive mixture problems, recovery of product from a dilute gas stream and the like, the vapor-phase aromatic nitrile (cyanide) processes suffer from the problems associated with the concurrent production of hydrogen cyanide and its disposal.

It has now been found that carbocyclic aromatic cyanides may be prepared by a liquid phase ammoxidation reaction wherein a methyl-substituted aromatic hydrocarbon, maintained in the liquid phase, is reacted with a gaseous ammoxidizing agent comprising ammonia and molecular oxygen at a temperature in the range of about 115° C. to about 260° C. in the presence of a manganese bromide catalyst and employing a ratio of about 0.1 to 2.0 mols of ammonia per mol of oxygen. In this reaction, the catalytic action of the manganese bromide catalyst is unique and specific. Other liquid phase oxidation catalysts, such as cobalt compounds, with or without the bromide anion, and other manganese compounds, in the absence of bromine or an available bromide, do not function as catalysts in this system, and are presumably poisoned by the conjoint presence of ammonia and oxygen under oxidative conditions. Hydrogen cyanide by-product production and disposal problems are not encountered in the present process. Surprisingly, the liquid phase ammoxidations of the present invention are not subject to the serious corrosion problems experienced in conventional heavy metal bromide catalyzed oxidation art.

In accordance with the invention process, methyl substituents of the methyl-substituted aromatic hydrocarbons may be preferentially converted to cyano groups. By definition, the feed compounds include the mononuclear and polynuclear aromatics which are substituted by at least one methyl group and may contain, in addition, other hydrocarbon substituents including alkyl (other than methyl) or aryl radicals. In the preferred form the charge compounds are the mono- and polymethyl-substituted benzenes such as toluene, ortho, meta- and para-xylene, hemimellitene, pseudo cumene, mesitylene, prehnitene, durene, isodurene, and pentamethyl benzene. Other methylbenzenes contemplated are the ethyltoluenes, the cymenes, the tertiarybutyltoluenes and the like. In the case of the polymethyl benzenes where the methyl substituents are located ortho to one another, the liquid phase ammoxidation reaction will result in the formation of aromatic cyclic imides in addition to the cyanide or nitrile. In the case of orthoxylene as the feed compound, partial conversion of feed and recycle of unconverted feed favors the production of the nitrile.

For the purposes of the present invention, namely, the production of carbocyclic aromatic cyanide, it is particularly preferred to employ the methyl-substituted aromatic hydrocarbons where in the case of the polymethyl substituents the methyl radicals are positioned in a meta or para relation to one another. Representative of these particularly preferred feed compounds are toluene, meta- and para-xylene, and mesitylene.

Operable temperatures for the process are in the range from about 115° C. up to about 260° C. At the higher temperatures, it may be necessary to use superatmospheric pressures in order to maintain the liquid phase required. Excellent results are obtained when the ammoxidation agent comprises anhydrous ammonia and an oxygen-containing gas, such as air, and the agent is premixed before introduction into the reaction zone. The agent may also be prepared in situ wherein ammonia and oxygen are introduced into the reaction zone in separate streams.

In general, the ammoxidation agent composition may vary; it may contain as much as two mols of ammonia per mol of oxygen and as little as 0.2 mol of ammonia per mol of oxygen. Qualitatively, there is an optimum ammonia to oxygen ratio for each set of reaction conditions and particular feed. As the optimum is exceeded, the rate of production of aromatic cyanide falls off until at about a ratio of 2 mols of ammonia per mol of oxygen in the ammoxidation agent, for all systems, the ammoxidation is to all practical purposes inhibited as a result of deactivation of the catalyst. Thus, in the ammoxidation of toluene, the optimum ratio may be as high as 1.4:1, while in the corresponding ammoxidation of metaxylene under the same conditions the optimum ratio may not exceed about 0.3:1. At the lower process temperatures, the ammonia to oxygen ratio of the ammoxidation agent is desirably in the lower range and may be as low as 0.1 mol of ammonia per mol of oxygen. Particularly desirable ammonia to oxygen ratios for the ammoxidation agent are in the range 0.2–2.0 to 1.

In an initial operation, for example, where an unfamiliar feed is to be employed, the ammoxidation agent to be employed is desirably one having a low ammonia to oxygen ratio, for example about 0.2–0.1 and even lower. Having established that oxidation of the feed is progressing as shown by the production of water or oxygen consumption, one may then gradually increase the ammonia content of the ammoxidation agent until a reduction is noted in the oxygen uptake rate.

The optimum ammonia-oxygen ratio for that reaction system will be slightly less than that at which the reduction in oxygen uptake occurred. Where a variation in the oxygen utilization is subsequently experienced, it may be desirable to adjust the ammonia-oxygen feed ratio in order to maintain the optimum ratio. Similarly, the optimum may be achieved by reducing the oxygen content of the ammoxidation agent while keeping the ammonia content constant.

Should the manganese bromide catalyst inadvertently become deactivated by the use of an ammoxidation agent containing too high an ammonia-oxygen mol ratio, recovery of catalyst activity is obtainable by substantially reducing the ammonia content of the agent and thereafter increasing the ammonia content of the agent when oxygen utilization has resumed. Frequently, the addition to the liquid phase of small amounts of ammonium bromide, for example, up to as much as 50 mol percent of the manganese catalyst employed, will accelerate the catalyst recovery.

The amount of manganese bromide catalyst which may be used, stated as weight percent of the hydrocarbon feed, may be as little as 1.0 and as much as 10 and even higher. The range from about 1 to about 5 is preferred. The catalyst may be introduced into the reaction zone as manganese bromide per se, or it may be produced in situ, for example, by the introduction of a manganese salt of an organic carboxylic acid, i.e., acetic acid, toluic acid, etc., and ammonium bromide or the equivalents (including manganese metal-hydrogen bromide, manganese oxide-hydrogen bromide and the like) thereof into the reaction zone.

During the course of these oxidations, some of the bromide may be converted to an unavailable form, and because it is usually desirable to maintain the catalyst at a high degree of activity, provision may be made to counteract this effect. To accomplish this, bromide in the form of ammonium bromide, for example, may be added initially in excess of that required stoichiometrically to produce the manganese bromide in situ, or small additions may be made at intervals during the course of the oxidation. A 50 mol percent excess of bromide is usually more than adequate for this purpose.

The production of aromatic cyanides in accordance with the process of the present invention may be effected in the absence of solvent. However, in the preferred manner of operation a diluent is used. Suitable diluents are ammoxidation-resistant, unsubstituted and inertly substituted aromatic compounds, such as benzene, naphthalene, biphenyl, and the like, including their chloro-, bromo-, and cyano-substituted derivatives. Benzonitrile is a preferred medium.

The following examples will serve to further illustrate the process of the present invention:

EXAMPLE 1

Toluene was converted to phenyl cyanide (benzonitrile) in a glass turboreactor fitted for efficient high speed stirring, basal admission of the ammoxidation agent, and a means for cooling the off-gas stream and delivering the condensate therefrom to a water separator and return of the non-aqueous portion of the condensate to the reaction vessel.

Charge 412 g. $\phi C \equiv N$ (4 mols), 184 g. $\phi CH_3$ (2 mols), 10 g. $MnAc_2 \cdot 4H_2O$ (0.04 mol), 4 g. $NH_4Br$ (0.04 mol)

Conditions

| | |
|---|---|
| Temperature, C°. | 170–175 |
| Pressure | Atmospheric |
| $NH_3:O_2$ ratio | 1.4:1.0 |
| Oxidizing gas rate, ml./min. (ambient temp.) | 653 |
| Time, hrs. | 13 |

Product composition

| | Mols |
|---|---|
| Benzonitrile | 5.19 |
| Potential benzonitrile values (recyclable) | .23 |
| By-product as nitrile equiv. | .20 |
| Toluene | .08 |

The above data indicate an in-hand yield of 60 mol percent of benzonitrile product and a potential in-hand yield of about 71 mol percent upon further conversion of the intermediate fraction. Actually, since the losses were known to be due to incomplete product and toluene removal from the reactor outgas stream, yields of the order of 86–90 mol percent are indicated. When the reaction is run under conditions of higher pressure, the time required for completion is greatly reduced.

EXAMPLE 2

2500 g. of a 25 mol percent solution of m-xylene (6.0 mols) in benzonitrile was oxidized to aromatic cyanides in a steel oxidation pressure vessel having a means as in Example 1 for the return to the reaction zone of the condensable organic materials in the effluent gas stream. Basal admission of the ammoxidation agent through gas jet nozzles provided stirring.

Conditions

| | |
|---|---|
| Temperature, C°. | 183 |
| Pressure, p.s.i.g | 50 |
| Time, hrs. | 4 |
| Ammonia feed rate mols/hr./mol xylene | 0.72 |
| Air rate s.c.f.h. (standard cubic feet per hour) | 50 |
| Conversion, percent | 100 |

Yield

| | |
|---|---|
| Aromatic cyanide product, mol percent | 95 |
| By-product (xylene equivalent), mol percent | 5 |

Aromatic cyanide product distribution, mol percent

| | |
|---|---|
| m-Tolunitrile | 31 |
| Isophthalonitrile | 10 |
| m-Cyanobenzamide+ammonium, m-cyanobenzoate | 55 |
| Recyclable potential cyanobenzene values | 3 |

From Example 2 it is to be seen that polymethylbenzenes are converted to the corresponding cyanobenzenes. The product mixture is readily separable into its several components by conventional chemical techniques, or it may be used per se, for example, as a feed to a vapor phase catalytic dehydration process stage to enhance yields of mono- and aromatic cyanides, i.e., tolunitrile and isophthalonitrile. Alternatively, aromatic polycyanide products may be removed from the reaction product mixture, and the lower cyanides may be returned to the reaction zone for the conversion of additional methyl groups to cyano groups by liquid phase ammoxidation as illustrated in Example 5.

EXAMPLE 3

In a pressure reaction vessel as in Example 2, a series of liquid phase ammoxidations was run wherein charges consisting of 16 mols of benzonitrile solvent, 2 to 4 mols of m-xylene, with the manganese bromide catalyst being prepared in situ from 0.16 mol of manganese acetate and 0.1 to 0.2 mol of ammonium bromide. In these runs combinations of the following ranges of variables were employed:

| | |
|---|---|
| Temperature, C°. | 175–200 |
| Pressure, p.s.i.g. | 60–150 |
| Reaction times, hrs. | 3.5–6 |

The ammoxidation agent was introduced into the reaction zone per se and also prepared in situ by the introduction of a benzonitrile solution of ammonia and a separate air stream.

In every instance conversions of m-xylene and yields of aromatic cyanides were comparable to those listed above. For the ammoxidations run at the higher temperatures, rates were correspondingly faster, and yields of the isophthalonitrile fraction were larger. No criticality was seen regarding the manner of introduction of the ammoxidation agent, whether premixed or prepared in situ, but for each set of reaction conditions there was an optimum ratio for the agent which, if exceeded, had an adverse effect upon the oxidation, and which, if continued, causes deactivation of the manganese bromide catalyst.

The product of a representative run was vaporized in a vaporization zone in the presence of ammonia, and the resulting gaseous mixture contacted with activated alumina at elevated temperatures. On the basis of m-xylene consumed in the ammoxidation, an 84 mol percent yield of isophthalonitrile was recovered.

EXAMPLE 4

In the manner described in Example 1, ammoxidations of m-xylene were run except that the diluents, terphenyl and 1,2,4-trichlorobenzene were used. These solvents were found to be satisfactory, and these runs indicate that oxidation-inert solvents may be used in the liquid phase ammoxidation process of the present invention.

EXAMPLE 5

In a pressure reactor as in Example 2, m-tolunitrile was oxidized as follows:

Charge

| | |
|---|---|
| m-Tolunitrile, mols | 34.2 |
| Manganese bromide, mols | 1.4 |
| Solvent | None |
| Ammonia, mols/hour | 3.76 |
| Air rate, s.c.f.h. | 50 |

Conditions

| | |
|---|---|
| Temperature, °C. | 184 |
| Pressure, p.s.i.g. | 52 |
| Time, hours | 3 |

Results

| | |
|---|---|
| Conversion, percent | 73 |
| Yield, mol percent: | |
| Isophthalonitrile | 41.5 |
| m-Cyanobenzamide+, m-Cyanobenzoic acid | 58.4 |

The foregoing data show that the methyl substitutents of methyl-substituted aromatic cyanides are oxidized by the liquid phase ammoxidation process of the present invention to yield aromatic polycyanides and cyano-substituted aromatic acids and amides. No solvent is required for the process but one may be used.

EXAMPLE 6

As in Example 5, the ammoxidation of m-xylene was run in the absence of a solvent medium.

Charge

| | |
|---|---|
| m-Xylene, mols | 28.3 |
| Manganese bromide catalyst, mols | 1.1 |
| Solvent | None |
| Ammonia, mols/hr. | 2.4 |
| Air rate, s.c.f.h. | 50 |

Conditions

| | |
|---|---|
| Temperature, °C. | 183 |
| Pressure, p.s.i.g. | 51 |
| Time, hours | 7 |

Results

| | |
|---|---|
| Conversion, percent | 98 |
| Yield, mol percent: | |
| m-Tolunitrile | 22 |
| Isophthalonitrile | 1.4 |
| m-Cyanobenzamide+, m-Cyanobenzoic acid | 74.9 |

EXAMPLE 7

In a steel oxidation vessel having a means for heating, stirring, basal admission of the ammoxidation agent, and water removal, 4 mols of orthoxylene in 12 mols of benzonitrile were ammoxidized in the presence of 0.16 mol of manganese bromide. The conditions were:

Conditions

| | |
|---|---|
| Temperature, °C. | 188–200 |
| Pressure, p.s.i.g. | 60 |
| Time, hours | 5 |
| Ammonia feed rate mols/hr./mol o-xylene | 0.3 |
| Air rate s.c.f.h. | 10 |
| NH₃:oxygen mol ratio | .5 |
| Conversion, percent | 1000 |
| Yield, mol percent: | |
| Phthalimide | 46 |
| o-Tolunitrile | 18 |

In the foregoing example it is to be noted that an appreciable yield of o-tolunitrile was produced. When the ammonia to oxygen mol ratio of the ammoxidation agent is increased, and with shorter reaction times and partial conversions, there is a substantial increase in the nitrile product yield.

EXAMPLE 8

As in Example 2, liquid phase ammoxidation of m-xylene was run, except that after a two-hour reaction time fresh feed containing catalyst, solvent, and m-xylene, in the same ratio as in the initial charge, was pumped into the reactor at a rate of 907 grams per hour. At the same time, a product stream, in like volume as the fresh feed, was removed from the reactor. The average residence time in this continuous reaction process was 2.2 hours. After 16 hours operation, and after having demonstrated wholly satisfactory operation as a continuous process, the run was terminated.

From the foregoing examples it is clear that methyl groups attached to an aromatic carbocyclic nucleus may be preferentially converted to cyanide groups under the process conditions. Because the aromatic nucleus merely provides an ammoxidation stable carrier for the methyl group or groups and is, of course, stable and unchanged under these conditions, the man skilled in the liquid phase oxidation art will readily recognize that representative stable aromatic nuclei includes napththalene, biphenyl, terphenyl, phenanthracene, as well as the benzene nucleus and the like.

Relative corrosivities for manganese bromide catalyzed molecular oxygen oxidations in an inert solvent, benzonitrile, were determined (1) in the absence of added ammonia, and (2) in the presence of added ammonia under otherwise comparable reaction conditions using standard steel corrosion test strips. Excessive corrosion rates, up to 200 mils per year, were experienced by the test strips in the conventional ammonia-free heavy metal bromide catalyzed oxidations. On the contrary, under the comparable ammoxidation conditions, the corrosion rates were negligible.

As will be evident to those skilled in the art, numerous modifications in this process can be made or followed, having in mind the foregoing disclosure and exemplification without departing from the spirit of scope of the disclosure and of the claims.

I claim:

1. Process for the production of carbocyclic aromatic cyanides which comprises reacting a methyl-substituted aromatic hydrocarbon with a gaseous ammoxidizing agent comprising ammonia and molecular oxygen in the presence of manganese bromide catalyst at a temperature in the range from about 115° C. to about 260° C., said aromatic hydrocarbon having only methyl-substitution and being selected from the group consisting of ammoxidizable methyl-substituted aromatic hydrocarbons maintainable in the liquid phase at a temperature in the range from about 115° C. to about 260° C., said gaseous ammoxidizing agent containing from about 0.1 to about 2.0 mols of ammonia per mol of oxygen and said catalyst being present in an amount in the range 0.1 to about 10 weight percent based upon said aromatic hydrocarbon.

2. The process of claim 1 wherein the reaction is conducted in the further presence of an inert diluent.

3. Process for the production of carbocyclic aromatic cyanides which comprises reacting a methyl-substituted benzene hydrocarbon with a gaseous ammoxidizing agent comprising ammonia, and molecular oxygen in the presence of manganese bromide ammoxidation catalyst at a temperature in the range from about 115° C. to about 260° C., said benzene hydrocarbon being selected from the group consisting of ammoxidizable-methyl-substituted benzene hydrocarbons maintainable in the liquid phase at a temperature in the range from about 115° C. to about 260° C., said gaseous ammoxidizing agent containing from 0.1 to about 2.0 mols of ammonia per mol of oxygen and said catalyst being present in an amount in the range 0.1 to about 10 weight percent based upon said aromatic hydrocarbon.

4. The process of claim 3 wherein said methyl-substituted benzene is m-xylene.

5. The process of claim 3 wherein said methyl-substituted benzene is p-xylene.

6. The process of claim 3 wherein the reaction is conducted in the presence of an inert diluent.

7. The process of claim 3 wherein the reaction is conducted in the presence of benzonitrile.

References Cited by the Examiner
UNITED STATES PATENTS 2,833,816   5/1958   Saffer et al. _____ 260—524

OTHER REFERENCES

Mahan et al., abstract of application 120,606, June 5, 1951.

CHARLES B. PARKER, *Primary Examiner.*
LEON ZITVER, *Examiner.*